United States Patent
Severson

(10) Patent No.: US 6,974,250 B2
(45) Date of Patent: Dec. 13, 2005

(54) TEMPERATURE SENSOR WITH CONTROLLED THERMAL OFFSET FOR DETERMINING STATIC TEMPERATURE

(75) Inventor: John A. Severson, Eagan, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 10/825,447

(22) Filed: Apr. 15, 2004

(65) Prior Publication Data
US 2005/0232331 A1   Oct. 20, 2005

(51) Int. Cl.⁷ .......................... G01K 13/02; G01K 1/16
(52) U.S. Cl. ..................................... 374/138; 374/142
(58) Field of Search ............................... 374/138, 142, 374/143, 147, 148

(56) References Cited

U.S. PATENT DOCUMENTS

| | | | |
|---|---|---|---|
| 2,942,472 A | 6/1960 | Harney | 374/138 |
| 2,970,475 A | 2/1961 | Werner | 374/138 |
| 4,403,872 A | 9/1983 | DeLeo | 374/138 |
| 5,043,558 A | 8/1991 | Byles | 219/201 |
| 5,628,565 A | 5/1997 | Hagen et al. | 374/143 |
| 5,653,538 A | 8/1997 | Phillips | 374/138 |
| 6,370,450 B1 * | 4/2002 | Kromer et al. | 374/135 |
| 6,609,825 B2 | 8/2003 | Ice et al. | 374/138 |
| 2004/0095984 A1 * | 5/2004 | Severson | 374/16 |

OTHER PUBLICATIONS

International Search Report.

* cited by examiner

Primary Examiner—Diego Gutierrez
Assistant Examiner—Stanley J. Pruchnic, Jr.
(74) Attorney, Agent, or Firm—Westman, Champlin & Kelly

(57) ABSTRACT

The present invention relates to providing a temperature sensor that is mountable on an aircraft and includes a thermometer or temperature sensing element for sensing temperature of airflow. A heater is provided on the probe to bias the temperature sensed by the thermometer or temperature sensing element, in a manner such that the temperature measured is at a substantially known offset from the static temperature surrounding the temperature sensor. Control of the offset can be achieved by regulating airflow or heat provided. The heating effect is controlled to be a substantially equal and opposite match to the decreased total temperature resulting from lower airspeed or decreased airflow. In this manner, the thermometer or temperature sensing element will essentially operate at a fixed offset above static temperature, that is the temperature in undisturbed air in which the aircraft is operating, over a fairly wide range of flow rates.

14 Claims, 3 Drawing Sheets

TEMPERATURE SENSOR WITH CONTROLLED THERMAL OFFSET FOR DETERMINING STATIC TEMPERATURE

BACKGROUND OF THE INVENTION

The present invention relates to a temperature sensor for determining static temperature of air through which an air vehicle is moving by heating the sensor to establish a thermal offset for a temperature sensing element carried in a probe and designed to maintain substantially the same offset as airspeed changes within useful operating limits.

Measurement of the total temperature of air in which air vehicles are operating is well understood, and it is known that the total temperature increases as Mach number increases. Several types of total temperature sensors are used for measuring this parameter. Most sensors use a strut mounted probe that extends into the air stream so air flows through ducts in the probe, in one of which a temperature sensor element is mounted. Generally, efforts are made to ensure that the boundary layer of air on surfaces of inlet air scoops or ducts of the probe does not interfere with the sensed temperature. Heaters are often used on the air scoop ducts and probe for deicing purposes. The de-icing heaters are positioned so that the heating effect, or influence on the temperature measured, is minimized. The probe or strut housings may also have shields to minimize stray heat, but there always is some de-icing heater error. The deicing heater error increases with decreasing airflow in current total temperature sensors.

The relationship between total temperature and static temperature is known to be a function of Mach number. Static temperature is typically the temperature of "still" or undisturbed air, and total temperature is the temperature which would be realized if relatively moving air could be adiabatically brought to rest, for example, temperature of the air layer at rest along the stagnation line of an airplane wing. In other words, all of the kinetic energy imparted to the air results in the air being warmed to the "total temperature". The higher the Mach number, the higher the total temperature for a given value of static temperature.

In practice, directly measuring true total temperature is never achieved because there is always some heat loss. A total temperature sensor acts much like the stagnation line of the wing but is optimized to minimize heat loss. A good total temperature sensor comes very close to indicating the true total air temperature.

On the other hand, there is no accurate way to measure static temperature directly on aircraft. Instead, it is easier to measure total temperature and use a separate pressure sensing probe to measure the total pressure and the static pressure, and then calculate static temperature from these measurements. This may, in fact, be the preferred approach if measurements of multiple air data parameters are required. If only a static temperature measurement is needed, however, pressure measurement instruments to provide static and total pressure inputs for determining static temperature add unnecessary weight, drag and complexity to the measurement system.

The present invention teaches obtaining static temperature (Ts) from a probe measuring the total temperature (Tt) without requiring separate pressure measurements.

SUMMARY OF THE INVENTION

The present invention relates to an air temperature sensor that is mountable on an air vehicle and includes a thermometer or temperature sensing element for sensing temperatures of air flowing across the sensing element. When the air vehicle is in motion, air enters ducts in a probe supporting the temperature sensing element and flows over the temperature sensing element. The sensed temperature is related to total temperature, and as the Mach number increases the temperature sensed also increases.

A deicing heater or other heater is provided in or on the probe and is capable of upwardly biasing the temperature sensed by the thermometer or sensing element. By appropriate design of the ducts, heater power, heater location, and/or sensing element location, as airspeed reduces and the total temperature decreases the temperature sensing element will be increasingly warmed by the heater. The sensed or measured temperature of the air can be maintained at a substantially known, constant offset from the static temperature of air surrounding the probe (and aircraft), across a range of Mach numbers or airspeeds. In other words, the heater has the effect of raising the measured temperature as the airspeed decreases, whereas the total temperature effect, will raise the measured temperature as airspeed increases.

The proper control of the offset preferably is accomplished by positioning the temperature sensing element relative to the airflow and controlling heat levels at the temperature sensing element location in order to eliminate the need for a separate pressure sensing probe. However, if airspeed information is independently obtained (inertial or GPS measurements could provide this information to a useful level of accuracy, for example) the heater can be actively controlled as a function of measured airspeed to provide the correct offset.

The control of the thermal offset provides a substantially equal and opposite change or match of the heater effect to the change of total temperature as airspeed changes. In this manner, the thermometer or sensing element will operate at a substantially fixed offset above static temperature, that is, the temperature in undisturbed surrounding air in which the aircraft is operating, over a fairly wide range of airspeed or airflow rates.

It can be understood that the range of operation at which this invention works has finite limits, because with no airflow at all the heat from the heater would likely overwhelm the thermometer or sensing element and the method of this invention would not work. At very low airflows, the total air temperature and the static temperatures are nearly the same, and thus the static temperature can be approximated to equal the total temperature. At the low flow rates, the heater can be turned off and the offset set to zero to obtain a direct and reasonably accurate indication of static temperature of the air stream in which the aircraft operates.

It can also be understood that altitude variation will influence the accuracy of this method because of air density variation and the resulting effect on heat transfer from the sensor. Active heater control could also be provided for altitude correction if altitude information were available from an independent measurement source; for example GPS or an inertial system.

DETAILED DESCRIPTION OF THE PREFERRED EMBODIMENTS

Figure 1:
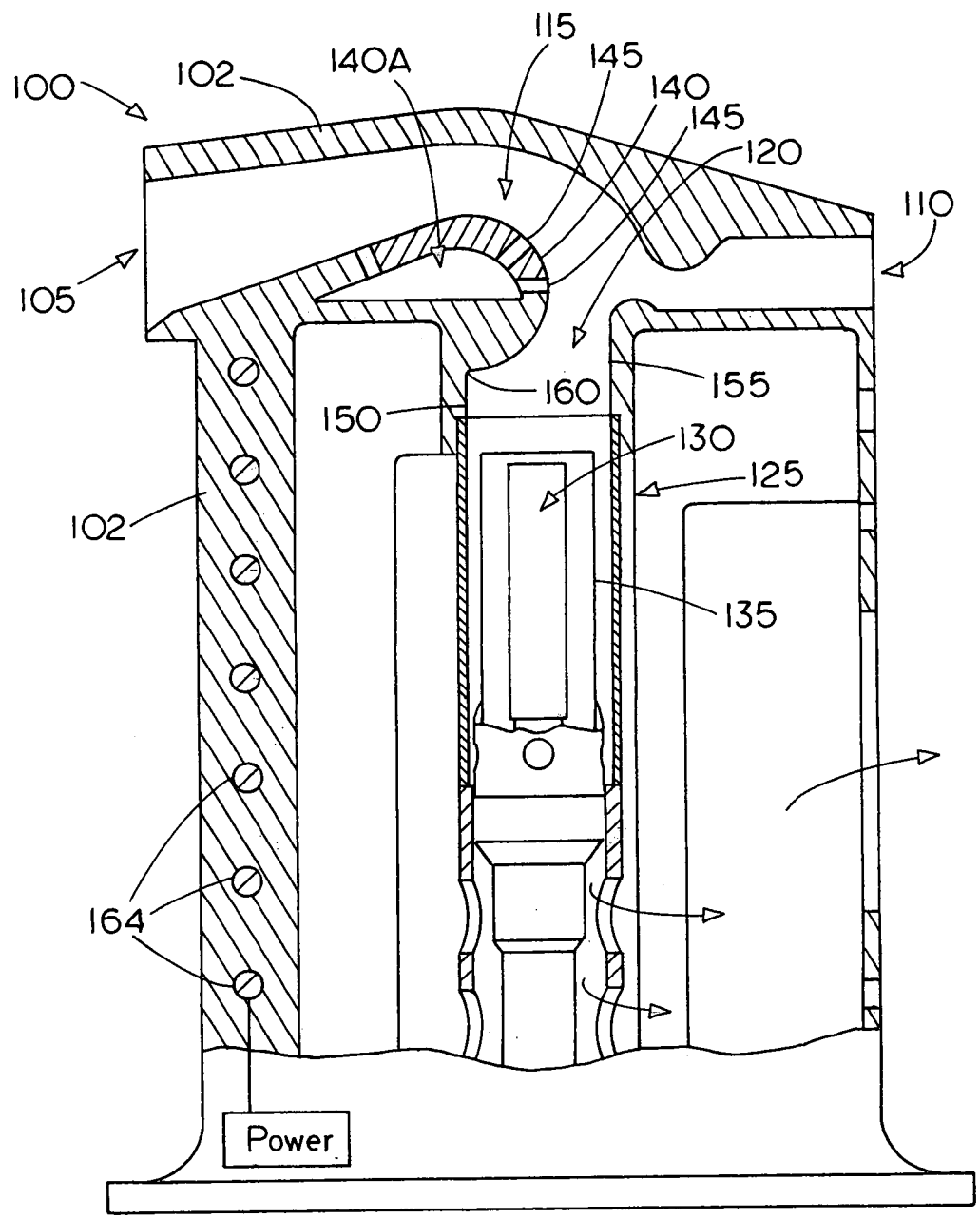
FIG. 1 is a cross sectional view through a typical total temperature air sensor utilizing a sensing element mounted for determining the total air temperature.

FIG. 1 is a diagrammatic illustration of a conventional total air temperature (TAT) probe 100, with portions shown in section. TAT probe or sensor 100 includes a housing or strut 102 which has a primary air inlet or inlet scoop 105 and a main exit channel 110 through which air from the free stream airflow (outside the probe) passes through. Also formed within housing 102 is a flow separation bend 115 which diverts a portion of the airflow between inlet scoop 105 and main exit channel 110 and redirects this portion into a total air temperature sensor flow passage 120. Particles in the airflow preferably are inertially separated from flow through the sensor flow passage 120 and exit out the exit channel 110. Positioned within sensor flow passage 120 is a sensor assembly 125 that includes a thermometer or temperature sensing element 130 which senses the total air temperature, and a radiation (heat) shield 135 positioned annularly around sensing element 130. The forward portion of the strut 102 has a deicing heater 164 embedded therein, which can affect the temperature sensed by temperature sensing element 130. The radiation shield 135 is designed to reduce the effect of the heaters and reduce sensing errors.

Flow separation bend 115 includes an inner elbow wall 140, which serves to redirect a portion of the airflow into sensor flow passage 120. Elbow wall 140 has bleed holes or ports 145, which bleed off boundary layer air by a pressure differential occurring between the inner passage 115 and an air passage 140A that exhausts out its end, to remove a portion of the airflow adjacent to the inner elbow wall 140 and thus to control the heated boundary layer of air to also reduce deicing heater error. The passage 140A discharges air through side ports of the strut. Total air temperature sensor flow passage 120 includes a forward wall (relative to redirected airflow in the sensor passage) 150, and an aft wall 155. Forward wall 150 has an upper end at point 160 at which the arc of inner elbow wall 140 ends. FIG. 1 shows a conventional total air temperature sensor.

Figure 2:
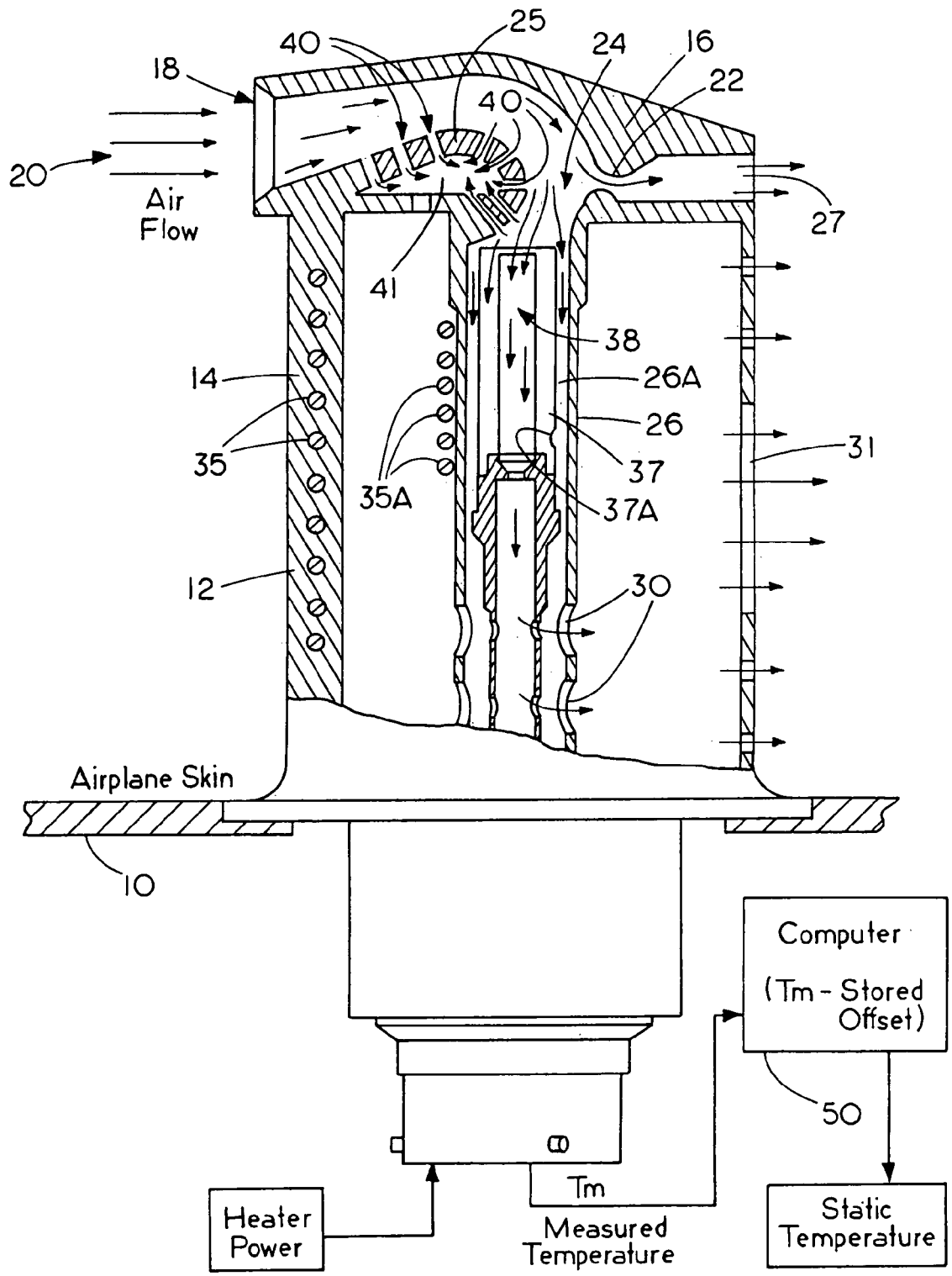
FIG. 2 is a cross sectional view of a total temperature sensor housing having a thermometer or temperature sensing element located in a modified airflow channel to provide a thermal offset according to the present invention.

In FIG. 2, an aircraft skin 10 supports a total temperature sensor probe 12 comprising a strut 14 and a flow tube or duct 16 mounted onto the outer end of the strut 14. The flow tube 16 can have any desired cross sectional shape and is generally rectilinear or shaped similar to a rounded end rectangle, and has an inlet end air scoop 18 through which free stream airflow indicated by the arrow 20 is introduced. The flow through the flow tube 16 is controlled by an outlet orifice 22 at the aft end 27 of the flow tube 16.

There is an opening 24 between the inlet end airscoop 18 and the aft end 27 of the flow channel. The opening 24 is in a tubular passageway that is just aft of a flow separation bend 25 and opens to a tube 26 in the interior of the strut 14. The interior of tube 26 forms a branch flow channel 26A. Liquid water and other particles are inertially separated so that little of the liquid water or particles flow into the branch flow channel 26A. The branch flow channel 26A has exhaust openings 30 and there are a plurality of outlet openings 31 at the rear of the strut. A temperature sensing element 38 is mounted in flow channel 26A for sensing the temperature of the airflow past the temperature sensing element. This type of flow housing is used for total temperature sensors, for example, the type shown in FIG. 1 and in U.S. Pat. No. 2,970,475.

Total temperature sensors as shown in FIG. 1 are designed to minimize influences of the deicing heater (such as deicing heater 164) on the temperature sensing element. As stated, this is accomplished by using a shield around the temperature sensing element and by bleeding off heated boundary layer air through holes or ports 145 in the lower surface of the inlet scoop of the probe shown in FIG. 1.

The parameters and design features used to minimize the heating effect on the measured air temperature from the deicing heaters in a total temperature sensor include: (1) routing and heating levels of the deicing heaters; (2) selecting the position of the sensing element to be in a core of airflow minimally affected by the deicing heaters; and (3) managing the amount of air that flows over the sensing element by selecting the amount of restriction in the main internal flow channel and/or the amount of restriction in branch flow channel 26A.

According to the present invention, some or all of the parameters 1–3 above are adjusted to cause the deicing heaters, and any added heaters, to affect the temperatures sensed and measured by the temperatures sensing element 38 by providing higher heat output from the provided heaters, positioning the temperature sensing element so as to be closer to the heaters, causing the temperature sensing element to be heated by boundary layer air, and/or by changing the airflow patterns over the temperature sensing element. Analytical tools such as computational fluid dynamics (CFD) can be used in order to make the adjustments in the parameters to obtain a sensor of the present invention. The objective is to achieve a known heating effect on the temperature sensing element 38 of FIG. 2 such that the temperature sensing element 38 senses an air temperature which is a function of total temperature and the heating effect. The combined effect of total temperature and the heaters is adjusted so the sensed temperature is at a relatively constant offset temperature above the static air temperature. It is known that the total temperature increases with an increase in airspeed and decreases with a decrease in airspeed. As airflow past the temperature sensing element increases as airspeed increases, the heating effect will decrease with an increase in airspeed and increase as the airspeed reduces, so the desired relatively constant offset in the temperature sensed by temperature sensing element 38 can be achieved.

Calibrating total temperature sensors such as that shown in FIG. 1 in a wind tunnel is carried out routinely by those of ordinary skill in the art and the sensor of the present invention can be calibrated in a wind tunnel using the same techniques. The static temperature can be easily calculated from wind tunnel pressure and temperature measurement instrumentation and the airspeed in a wind tunnel is easily adjusted across a desired range. The total temperature can be measured independently with a sensor such as that shown in FIG. 1. A total temperature standard is typically included in the wind tunnel instrumentation suite. Modifying various flow channels in the housing of FIG. 2, as well as changing the position of the temperature sensing element will change the flow over the temperature sensing element. The heaters can also be changed in power or location to realize a uniform offset between actual static temperature and the measured temperature in the tests.

The number and size of the boundary layer bleed ports 40, and the exit of air from the boundary layer bleed ports through the channel 41 can be changed to adjust the heating effect. The size of the orifice 24 can be changed and openings 30 can be resized to alter the airflow. Other structural changes can be made for varying the airflow, or the temperature sensing element can be mounted closer to the heater.

The strut 14 according to the present invention is heated with electric resistance deicing heaters shown schematically at 35 at desired locations along the strut leading edge and in other desired locations on the walls of the housing. As shown in FIG. 2, in addition to the deicing heater needed, there is an extra heater section 35A on an interior wall of the strut. The heater 35A is on tube 26 and will affect the temperature of the air sensed by temperature sensing element 38, which is mounted in the flow passageway 26A. Shield 37 can be removed or or made to only partially surround the temperature sensing element. As shown there is a large opening at the front of the shield 37 in order to increase the effect of the heaters. The shield 37 has flow outlets 37A at the lower end, for flow control, as well.

The amount of heating effect on the air temperature sensed by the temperature sensing element 38 also can be controlled mechanically. Positioning the temperature sensing element 38 in a location in the housing where the heat from the heater is greater or less and where the airflow is greater or less can provide the desired known temperature offset.

In the present invention, the air sensed by the temperature sensing element 38 is intentionally heated to a desired level, rather than attempting to minimize the heater effect as is done with a total temperature sensor as shown in FIG. 1. The temperature sensed by temperature sensing element 38 is intentionally raised sufficiently by the heaters 35 and 35A to be higher than the total air temperature normally sensed by a temperature sensing element mounted as shown in FIG. 1 and using conventional deicing heaters.

By selecting heater size and placement, and the amount of airflow across the temperature sensing element 38, the temperature of the air at the temperature sensing element 38 is raised to a controlled degree by adjustment of the parameters 1–3 outlined above. The sensor is thus calibrated to have a known offset from static temperature of the air over a reasonable range of airspeed.

Due to the cooling effect of air against the heated probe surface, the heating of temperature sensing element 38 from the heaters will be less at higher airspeeds than at lower airspeeds. Conversely, air flowing past temperature sensing element 38 will experience an increase in temperature due to higher total air temperature at higher airspeeds. Thus the operating temperature offset of temperature sensing element 38 above static temperature can remain fairly constant over a range of airspeeds.

The signal from thermometer or temperature sensing element 38 can be fed through a computer 50. The temperature offset is known from wind tunnel tests or CFD analysis. It is substantially the same offset at different airspeeds. The temperature offset value is stored in memory in computer 50. The computer 50 calculates static temperature as an output that is based upon subtracting the offset value from the measured temperature value of temperature sensing element 38. Thus, no pressure sensing is necessary. Subtracting the offset temperature from the measured temperature provides an indication of static temperature. The measured value of static temperature could further be correlated to airspeed and/or altitude to increase accuracy and extend useful airflow range if measurements of these parameters were available from an independent source. A GPS or inertial system can provide such information to a useful level of accuracy. Computer 50 has the optimal airspeed and altitude inputs 51 and 51A from such separate sources. The correction relationships could be determined through wind tunnel testing and stored in the computer's memory.

Figure 3:
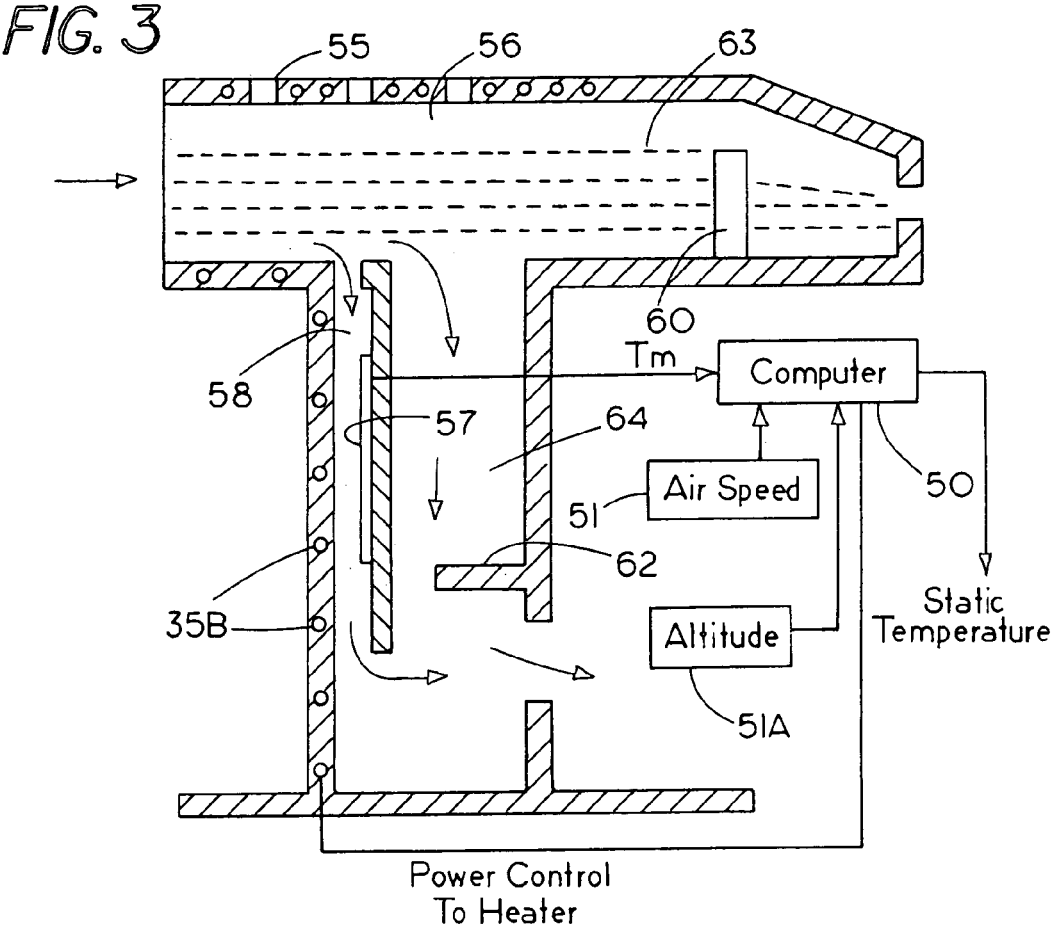
FIG. 3 is a cross section of a modified form of the invention providing an active controller for a heater to obtain a known offset of the measured temperature from static temperature.

FIG. 3 illustrates a sensor housing or probe 55, with a flow tube 56 and a temperature sensing element 57 positioned in a flow channel 58 so as to be influenced by the heater 35B to provide an offset temperature from true total temperature. The heater 35B is shown as being controlled as to heat output by the computer 50. Active control of the heater 35B will reduce the heat output as the airspeed decreases and/or as altitude increases to compensate for lower heat transfer to the air under these circumstances. The computer will adjust the heat from the heater as a function of airspeed and altitude, thereby maintaining a constant temperature offset between the sensed temperature at temperature sensing element 38 and the static temperature. Separate indications of airspeed and altitude are needed for such heater control.

The housing 55 can include temperature sensors 60 and 62 in the main flow channel 63 and in a branch channel 64, respectively for detecting icing conditions and liquid water, as described in detail in commonly owned U.S. patent application Ser. No. 10/299,207 (now allowed) filed Nov. 10, 2002, which is incorporated by reference.

Locating the thermometer in a flow stream that alters its flow velocity and thermal characteristics as the airspeed changes permits the thermal offset to be maintained.

Figure 4:
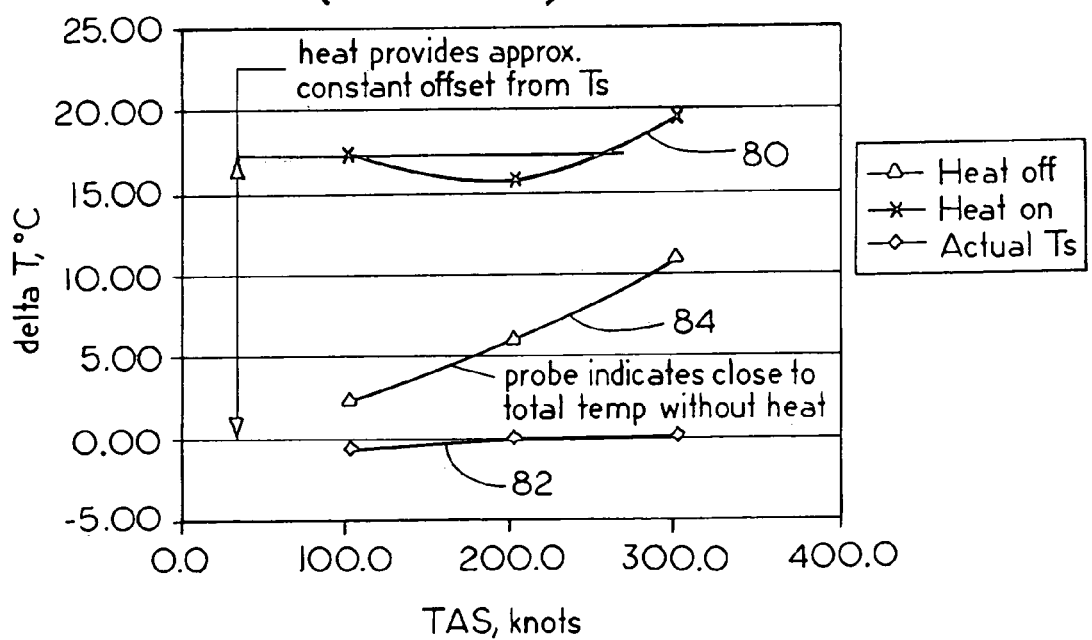
FIG. 4 is a plot of measured temperature minus static temperature (offset or delta T) versus true airspeed utilizing the invention.

FIG. 4 shows a plot of results of tests on a sensor embodying the principles of the invention by heating the probe to influence the sensed temperature in a manner similar to that described in connection with FIG. 2. In particular, FIG. 4 shows test results from a test probe, with the measured temperature minus static temperature (delta T) in degrees Celsius on the vertical scale and true airspeed (TAS) on the horizontal scale. With the heater on and affecting measured temperature the plot 80 shows the results at different airspeeds. The plot 82 represents the actual (separately determined) static temperature, and it can be seen that the offset amount is stable enough for use across a 200-knot range of true airspeed. This provides generally an average offset of about 17.5° C. from the actual static temperature. Plot 84 in FIG. 4 illustrates the total temperature as indicated by the test probe with the heaters off is close to the total temperature sensed with a probe such as that shown in FIG. 1.

Of course, it can be understood that the range of operation has finite limits, because with no airflow at all the heat from the heater would likely overwhelm the thermometer or temperature sensing element and the method would not work. In very low airspeeds the total air temperature and the static temperatures are nearly the same, and thus at very low flow rates the static temperature can be approximated by turning off the heater and setting the offset to zero.

Although the present invention has been described with reference to preferred embodiments, workers skilled in the art will recognize that changes may be made in form and detail without departing from the spirit and scope of the invention.

What is claimed is:

1. A method of providing an indication of static temperature for an object in a free stream airflow wherein a relative velocity of the object to the air mass changes, comprising providing a probe subjected to the free stream airflow and providing an airflow channel in the probe, heating air flowing through the channel, providing a temperature sensing element positioned in the airflow channel to measure temperature of air flowing through the airflow channel, and maintaining the temperature measured by the temperature sensing element at a substantially known offset above the static temperature of the free stream airflow.

2. The method of claim 1 further including the step of adjusting at least one of the functions of heating the air flowing through the channel and controlling the velocity of air flowing through the channel to cause the temperature sensed by the temperature sensing element to change with velocity of air flowing through the channel inversely with a change of total temperature caused by the relative velocity of the free stream airflow and the object.

3. The method of claim 1 further subtracting the known offset from the temperature sensed by the sensing element to obtain the static temperature of the free stream airflow.

4. The method of claim 2 wherein the at least one function comprises adjusting the heating of the air flowing through the channel as a further function of altitude.

5. The method of claim 2 including determining altitude of the object and adjusting the heating function to correct for altitude changes.

6. The method of claim 1 further comprising providing a second flow channel in said probe open to the airflow channel and extending laterally therefrom, the temperature sensing element being in the second flow channel, and adjusting the flow of air through the second flow channel in relation to the relative velocity to obtain the known offset.

7. The method of claim 1 including adjusting the heater to control heating of the air flowing through the airflow channel to obtain the known offset.

8. An air temperature sensing housing having a strut projecting into air, the air having a velocity relative to the housing, the housing having a passageway carrying an airflow through the housing, a heater for heating at least a portion of the housing, and a temperature sensing element mounted in the passageway in a location such that as airflow across the temperature sensing element decreases, the effect of the heater on the temperature measured by the temperature sensing element increases at a predetermined relationship.

9. The air temperature sensing housing of claim 8, further characterized by the housing having an upstream facing flow channel, the passageway opening to the flow channel, the airflow in the passageway comprising a portion of a primary airflow entering the flow channel.

10. The air temperature sensing housing of claim 8, wherein the heater is positioned on the at least a portion of the housing and is constructed to bias the temperature sensed by the temperature sensing element to indicate a temperature higher than the total temperature of the airflow.

11. The air temperature sensing housing of claim 10 wherein there is a controller-connected to control the heater to provide a heat output to bias the temperature sensed by the temperature sensing element, the controller adjusting the heat output in response to changes in altitude of the housing.

12. An air temperature sensor for measuring air temperature comprising a housing having a strut projecting from an aircraft into air having a relative velocity with respect to the housing, the housing having a main flow channel carrying an airflow from an inlet to an outlet, a branch passageway open to the main flow channel and configured to carry a portion of the airflow at the inlet to the main flow channel through the housing, a heater for heating at least a portion of the strut and housing to raise the temperature of air in the branch passageway, and a temperature sensing element mounted in the branch passageway in a location such that as airflow velocity in the branch passageway decreases, the heating of air in the branch passageway by the heater increases at a known relationship.

13. The air temperature sensor of claim 12 wherein the known relationship comprises a known offset from static temperature of the air into which the housing projects.

14. The air temperature sensor of claim 12 further comprising a controller coupled to control heat output of the heater, the controller controlling the heat output at least partially in response to changes in one of the parameters of relative velocity between the housing and the air into which the housing projects and the altitude of the housing.

* * * * *